Jan. 28, 1969     E. H. LORENCE     3,424,318
TURNTABLE DRIVE MECHANISM
Filed Oct. 31, 1966     Sheet 1 of 2
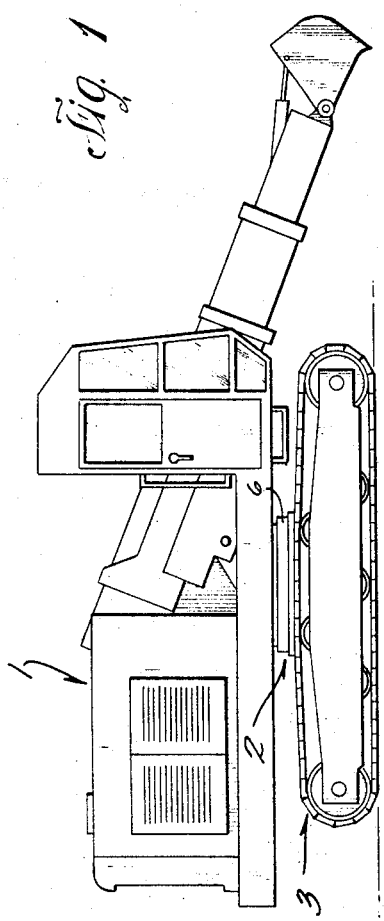
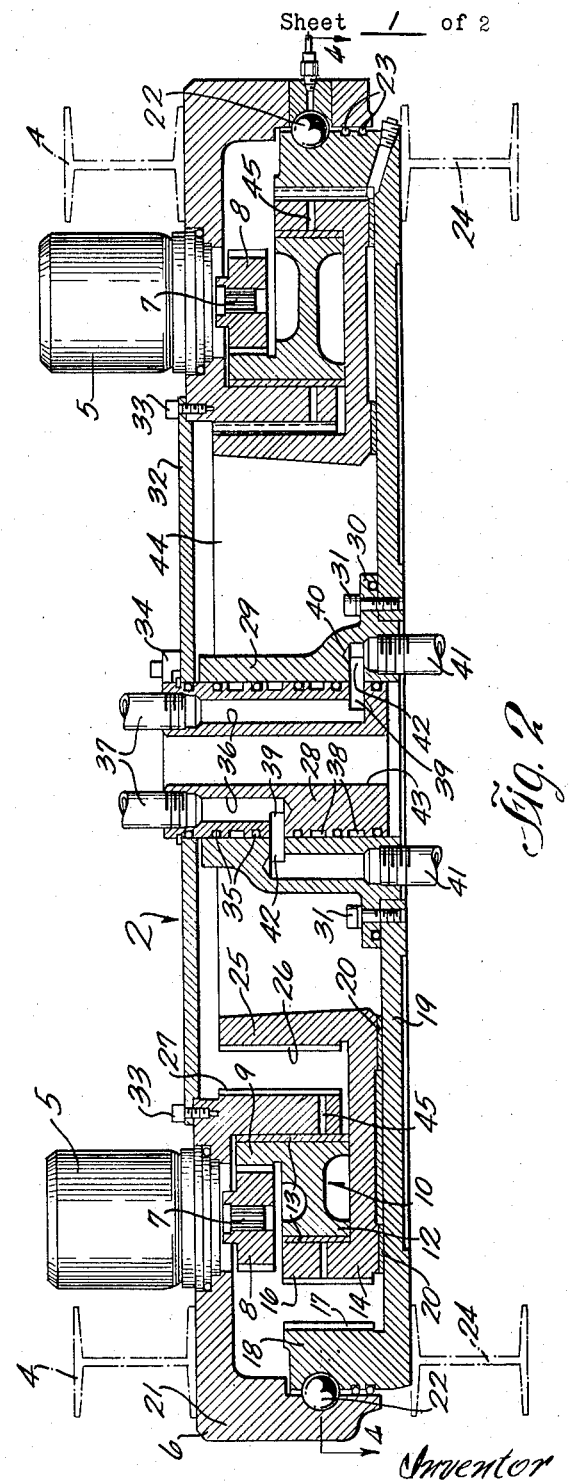
Inventor
Ervin H. Lorence
BY
Andrus & Starke
Attorneys.

Jan. 28, 1969  E. H. LORENCE  3,424,318
TURNTABLE DRIVE MECHANISM

Filed Oct. 31, 1966  Sheet 2 of 2

Inventor.
Ervin H. Lorence
BY
Andrus & Starke
Attorneys.

United States Patent Office 3,424,318
Patented Jan. 28, 1969

3,424,318
TURNTABLE DRIVE MECHANISM
Ervin H. Lorence, Milwaukee, Wis., assignor to Lorence Manufacturing Corporation, Milwaukee, Wis., a corporation of Wisconsin
Filed Oct. 31, 1966, Ser. No. 590,797
U.S. Cl. 212—69
Int. Cl. B66c 23/84; F16h 1/28
13 Claims

ABSTRACT OF THE DISCLOSURE

A turntable drive mechanism including a pair of hydraulic motors mounted on the turntable and the motors drive an eccentric ring which is journalled for rotation about an annular flange which extends downwardly from the turntable. The outer eccentric surface of the eccentric ring rides against the inner annular surface of an outer floating gear having a series of teeth which engage the internal teeth on a fixed gear ring formed on the base.

The outer floating gear is connected integrally with a second smaller gear which rotates with the larger outer gear. The teeth of the smaller inner gear mesh with the internal teeth of a second gear ring formed on the annular flange of the turntable. The gear ring on the base has a greater number of teeth than the mating outer gear and similarly the turntable gear ring has a greater number of teeth than the mating inner gear and the difference in the number of teeth between the outer gear and the gear ring on the base is the same as the difference in the number of teeth between the inner gear and the turntable gear ring.

As the eccentric ring is rotated, the outer gear will be moved by a wedging action in the opposite direction and at a slower rate of speed than the eccentric ring to provide a speed reduction. As the inner gear is connected integrally with the outer gear, it also rotates with the larger outer gear and thereby drives the turntable gear ring by wedging action in the opposite direction and at a slower rate of speed to provide a second speed reduction.

---

This invention relates to a rotary drive mechanism and more particularly to a turntable drive for construction equipment such as backhoes, cranes and the like.

In heavy construction equipment, such as a backhoe or crane, the engine and cab, as well as the working member, are supported on a turntable or slew ring which is mounted for rotation with respect to the supporting frame. In many instances a hydraulic drive mechanism is employed to rotate the turntable, and the conventional hydraulic drive mechanism generally includes a hydraulic motor acting through a gear train transmission. In order to drive the turntable at a relatively low speed of 4 to 6 r.p.m., an expensive and complicated gear train is employed to provide the necessary speed reduction.

In some smaller units less costly hydraulic cylinders are substituted for the hydraulic motor to rotate the turntable. However, the hydraulic cylinders are capable of rotating the turntable only through a small arc and a full 360° rotation cannot be obtained.

The present invention is directed to a turntable drive mechanism for heavy construction equipment which provides a full 360° rotation and is substantially less costly and smaller in size than the conventional unit having the same speed reduction capacity. The present invention is an improvement over the drive mechanism disclosed in the copending patent application Serial No. 509,031, now Pat. No. 3,369,672, filed Nov. 22, 1965, and entitled Turntable Drive for Backhoe. According to the invention, a pair of hydraulic motors are mounted on the upper surface of the turntable and each hydraulic motor carries a pinion which operates through a gear to drive an eccentric. The eccentric is journalled for rotation about an annular flange which extends downwardly from the turntable, and the outer surface of the eccentric rides against the inner annular surface of an outer floating gear. The outer gear has a series of teeth which engage the internal teeth on a fixed gear ring, and the teeth of the gear ring are of identical size to the teeth in the gear, but the gear ring has a greater number of teeth than the gear so that the external diameter of the gear is substantially smaller than the internal diameter of the gear ring. As the eccentric is rotated, the gear will be moved by a wedging action in the opposite direction and at a slower rate of speed than the eccentric to provide a speed reduction.

The outer floating gear is connected integrally with a second smaller gear which rotates with the larger outer gear. The smaller inner gear is also provided with a series of teeth identical in size to the teeth of the outer gear and which mesh with the internal teeth of a second gear ring formed on the turntable. The turntable gear ring has a greater number of teeth than the mating inner gear and the difference in the number of teeth between the inner gear and the turntable gear ring is the same as the difference in number of teeth between the outer gear and the outer gear ring.

The inner gear which is formed integrally with the outer gear rotates with the outer gear and at the same speed. As the teeth in the inner gear are of identical size as the teeth in the outer gear, the turntable gear ring will be moved by a wedging action in the opposite direction and at a slower rate of speed than the inner gear to provide a second speed reduction and thereby drive the turntable at a substantially reduced rate of speed.

The drive mechanism of the invention provides a substantial speed reduction from the hydraulic motor to the turntable with a minimum number of parts. By decreasing the number of parts, the overall cost of the drive mechanism is reduced over conventional units. Furthermore, the drive mechanism is highly compact and has substantially less weight than the conventional unit and yet permits the turntable to rotate with a variable speed through a full 360° travel.

As a further advantage, the engagement of the gears with the gear rings provide a positive lock against free turntable rotation and eliminates the necessity for a turntable locking mechanism. The positive lock provided by the gears prevents the cab and turntable from rotating by gravity if the backhoe or crane is parked on a hill or slope. In the conventional drive mechanism a separate brake is required to prevent free rotation by gravity movement of the cab.

As a substantial number of teeth of each gear are in engagement with the teeth on the corresponding gear ring at any one time, a stronger unit is provided which is not dependent on the individual strength of the gear teeth.

As a pair of hydraulic motors are employed to rotate the eccentric, a more equalized power input is provided which reduces the overall depth of the drive unit.

By locating the eccentric a substantial distance radially outward of the center of rotation, lesser power is necessary to supply the driving force to the turntable with the result that the stock thickness of the elements can be reduced. Moreover, as the eccentric has a relative large diameter due to its spaced location from the axis of rotation, the bearing surface area is increased and less costly sleeve bearings can be employed for journalling the eccentric which substantially reduces the cost of the unit. In a drive unit in which the eccentric is located adjacent the center of rotation, the eccentric has a smaller bearing surface area due to its lesser diameter and roller bearings are generally required to journal the eccentric.

Other objects and advantages will appear in the course of the following description.

In the drawings:

FIG. 1 is a side elevation of a conventional backhoe employing the drive mechanism of the invention;

FIG. 2 is a vertical section showing the turntable drive mechanism;

Figure 3:
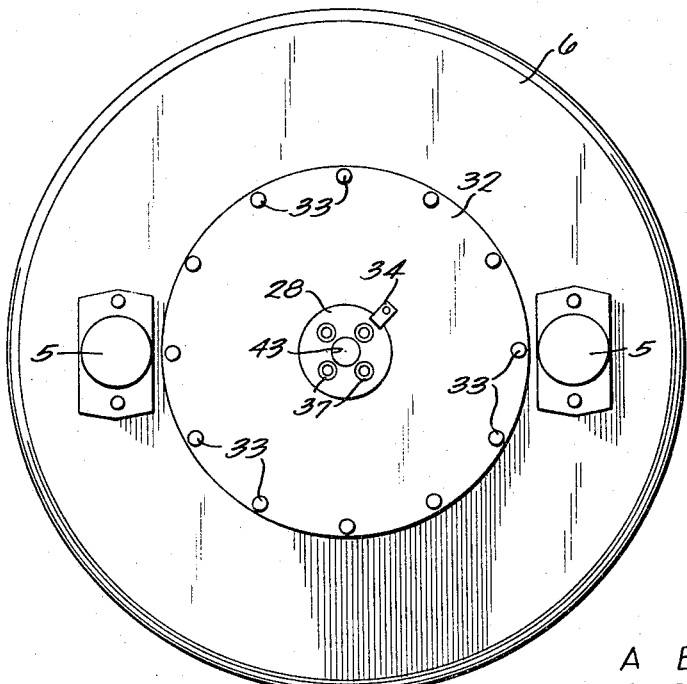
FIG. 3 is a plan view of the turntable.

The drawings illustrate a conventional backhoe having a cab and engine unit 1 supported on a turntable 2 which is mounted for rotation on the supporting structure or tread 3 of the backhoe. As shown in FIG. 2, a pair of beams 4 are secured to the upper surface of the turntable and support the cab and engine unit 1 so that the cab will rotate in accordance with rotation of the turntable.

A pair of reversible, variable drive, hydraulic motors 5 are mounted on the upper casting 6 of turntable 2. The drive shaft 7 of each motor 5 carries a pinion 8 and the pinions 8 engage a gear 9 formed on the upper end of an eccentric ring 10.

As shown in FIG. 2, the eccentric ring 10 is journalled for rotation about an annular flange 11 which extends downwardly from the casting 6 by a sleeve bearing 13. Thus, rotation of the pinions 8 drives the gear 9 to rotate the eccentric ring 10 about the axis of the turntable.

The outer eccentric surface 12 of eccentric ring 10 is journalled by sleeve bearing 13 within the central opening of gear 14 which is an integral part of floating ring 15. Gear 14 is provided with a series of teeth 16 which engage the internal teeth 17 on a fixed gear ring 18 formed integrally with the base plate 19.

To provide a drag or braking force on turntable rotation, a pair of wear rings 20 formed of a wear resistant metal, such as aluminum bronze, are secured to the bottom surface of the floating ring 14 and ride on the base casting 19 as the ring 14 rotates.

The base casting 19 and gear ring 18 are fixed, and the turntable casting 6 is provided with a downwardly extending peripheral flange 21 which is journalled about the gear ring 18 by a series of ball bearings 22. O-ring seals 23 are located within suitable recesses in the gear ring 18 and serve to seal the joint between the members.

Beams 24 are secured to the lower surface of the base casting 19, and beams 24 are connected to the supporting structure or tread indicated generally by 3.

The floating ring 15 has a generally U-shaped cross section and the inner portion of ring 15 defines a second gear 25 having a series of teeth 26 which are adapted to engage the teeth 27 formed on the downwardly extending flange or ring 11 on casting 6.

Figure 4:
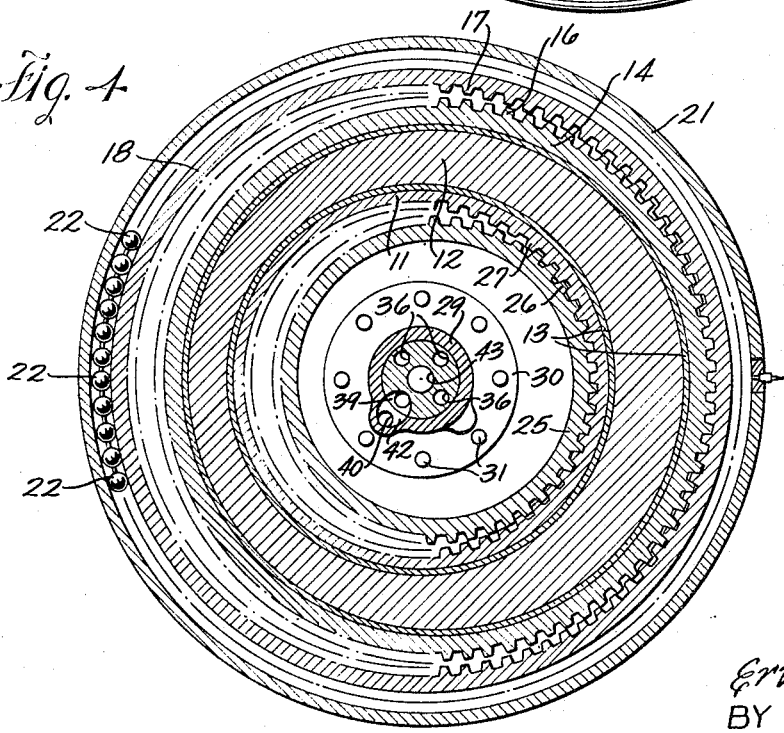
FIG. 4 is a section taken along line 4—4 of FIG. 2.

While the shape of the teeth 16 and 17 is not critical, the teeth 16 and 17 are of identical shape and size. The ring 17 has a greater number of teeth than the gear 14. Generally there will be from 2 to 4 more teeth 17 than teeth 16. This results in the external diameter of the gear 14 being substantially smaller than the internal diameter of the gear ring 18 as shown in FIG. 4. Due to the difference in the number of teeth, only about 10 or 12 of the teeth 16 will be in engagement with the teeth 17 at any time during rotation of the gear 14.

The pitch of the eccentric 12 has a definite relation to the pitch diameter of the teeth 16 and 17, and the pitch diameter of the teeth 16 and 17 determines the throw. For example, if there are about 40 8-pitch teeth 17, or a pitch diameter of 5 inches, and there are 37 8-pitch teeth 16, or a pitch diameter of 4 5/8 inches, the difference in pitch diameter would be 3/8 of an inch and the throw of the eccentric 12 would be one-half of the difference in pitch diameter or 3/16 of an inch.

The teeth 26 and 27 are identical in size and shape to each other and are also identical in size and shape to the teeth 16 and 17. There are a lesser number of teeth 27 than teeth 26, and the difference between the number of teeth is the same as the difference in number of teeth between teeth 16 and 17. For example, if there are 85 teeth 17 and 82 teeth 16, a difference of 3, there can be 40 teeth 26 and 37 teeth 27, also a difference of 3.

The eccentric ring 10 is journalled freely about the flange 11. As the eccentric rotates, the gear 14 is moved by the eccentric surface 12 at a reduced speed in the opposite direction of rotation of the eccentric by a wedging type of action. For example, if the gear ring 18 contains 85 teeth, while the gear 14 contains 82 teeth, a difference of 3, the gear 14 will move through an arc equal to the length of 3 teeth during each revolution of the eccentric 12. This is more clearly shown in FIG. 5. Point A on gear 14 will move to a point B during one revolution of the eccentric 12 and the arc AB is equal to the arc inscribed by 3 teeth, which is a difference in the number of teeth between gear ring 18 and gear 14. Thus, a speed reduction is provided between the input shaft and the gear 14 and the gear will only move to an arc equal in length to the difference in the number of teeth between the gear 14 and the gear ring 18 during each revolution of the eccentric 12.

Figure 5:
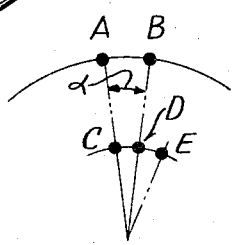
FIG. 5 is a diagrammatic representation showing the relative movement of the transmission elements.

As the gear 25 is formed integrally with the gear 14, the gear 25 will move through the same angular displacement as the gear 14. Referring to FIG. 5, if the gear 14 is moved a distance AB equal to the length of 3 teeth for each revolution of the eccentric 12, the gear 25 will be moved through the same angular displacement shown by $\alpha$ in FIG. 5. However, as the teeth 26 on gear 25 are the same size as the teeth 16, the angular displacement A does not equal the arc CE inscribed by the 3 teeth on gear 25. Thus as the gear 25 moves with the gear 14, the ring 11 and casting 6 slip or move by a wedging action in the opposite direction to compensate for this difference DE between the angular displacement CD and the arc CE inscribed by 3 teeth. The ring 11 slips or moves in the opposite direction a distance sufficient to enable the teeth 26 of gear 25 to maintain engagement with the teeth 27 of ring 11, and this results in the ring 11 moving in the opposite direction and at a slower speed than the floating ring 15 to provide a second speed reduction. Speed reduction between the gear 25 and the gear ring 11 will be proportional to the arc DE. As previously mentioned, casting 6 is integral with the gear ring 11 and will rotate with the ring at a slow variable speed generally in the range of 4 to 6 r.p.m.

In order to provide a connection for hydraulic lines through the rotating turntable, a sleeve coupling 28 is journalled for rotation within the central opening in a sleeve 29. The lower flange 30 of sleeve 29 is connected to the base casting 19 by a series of bolts 31. In addition, a cover plate 32 is secured to the upper casting 6 by bolts 33 and the coupling 28 extends upwardly through the central opening in the plate 32. To maintain the coupling 28 in position, keeper 34 is mounted on the upper surface of cover plate 32 and projects inwardly within a slot formed in the upper surface of the coupling 28.

As best shown in FIG. 2, the inner surface of the sleeve 29 is provided with a series of recesses and O-ring seals 35 located within the recesses prevent leakage of oil or other hydraulic fluid between the members.

The coupling 28 is provided with a series of vertical passages 36 which are located 90° apart. A hydraulic fluid supply line 37 is connected to the upper end of each of the passages 36 and serves to supply oil or other hydraulic fluid to the passages. The outer periphery of the coupling 28 is provided with a series of vertically spaced recesses or grooves 38, with the number of grooves corresponding to the number of oil passages 36. A curved recess 39 provides communicating between one of the oil passages 36 and one of the peripheral grooves 38 so that oil from the passage can flow freely into the peripheral groove. In addition, the sleeve 29 is also provided with a series of vertical oil passages 40 and hydraulic lines 41 are connected to the lower end of the passages. A curved recess 42 connects each of the passages 40 in sleeve 29 with the peripheral grooves 38 in the coupling 28, so that oil flowing within the grooves 38 will flow through the recess 42 and into the passage 40 within the sleeve 29. With this construction each recess 42 will always be in communication with the corresponding peripheral groove 38 in the coupling 28 as the coupling rotates so that oil is continuously supplied to the lines 41. The hydraulic lines 41 can be connected to the outriggers of the backhoe or to hydraulic motors for endless treads if the backhoe is mounted on treads rather than on a truck body.

The coupling 28 is also provided with a central opening 43 which is adapted to receive electrical cables used for remote control of the vehicle on which the backhoe is mounted. By use of the remote control the backhoe operator can move the vehicle back and forth, as well as operating the backhoe so that only one man is required to operate both the backhoe and the vehicle.

The interior 44 of the turntable 2 is adapted to be filled with oil or other lubricating liquid. During operation, the rotation of the gears 14 and 25 serves to pump the oil upwardly within the interior of the turntable to lubricate the various rotating elements. In addition flange or gear ring 11 and gear 14 are each provided with a series of openings 45 which serve as passages through which the oil is circulated to the sleeve bearings 13 and 15.

While the drawings illustrate the use of two hydraulic motors 5 in driving the eccentric 10, it is contemplated that any number of hydraulic motors can be employed, depending on the particular application.

The turntable mechanism of the invention provides a full 360° rotation and can be used for providing a turntable or slew ring rotation for construction equipment such as cranes, backhoes, shovels or the like. The drive mechanism is capable of producing a high reduction in speed with a minimum number of moving parts and is therefore substantially less costly then conventional gear train transmission units having the same reduction capacity.

The drive mechanism of the invention has greater strength than the normal gear train transmission in that a substantial number of teeth of each gear are in contact with teeth of the corresponding gear ring at any time. This is in contrast to the normal gear train in which only 1½ teeth are in meshing engagement.

As a number of hydraulic motors are employed to drive the eccentric, a more equalized power input is provided, with the result that the gear teeth can be formed with a lesser depth, thereby reducing the overall size of the turntable.

The eccentric 10 is located a substantial distance radially outward from the center of rotation of the turntable. This reduces the power requirement for the unit because it is not necessary to drive the unit from adjacent the center of rotation to the periphery. As the eccentric 10 has a substantial diameter, the bearing surface area is increased enabling the eccentric to be journalled in sleeve bearings rather than more costly ball or roller bearings.

Various modes of carrying out the invention are contemplated as being within the scope of the following claims, particularly pointing out and distinctly claiming the subject matter which is regarded as the invention.

I claim:

1. In an apparatus having a rotatable working member, a turntable to support the working member and disposed to rotate about an axis, an eccentric ring disposed beneath the turntable and having an inner cylindrical surface disposed concentrically of said axis and having an outer cylindrical surface disposed eccentrically with respect to said axis, drive means carried by the turntable and drivingly connected to the eccentric ring for rotating said eccentric ring, a first gear ring connected to the turntable, a floating annular gear unit including a large first gear and a second small gear, said first gear being located radially outward of said eccentric ring and the outer eccentric surface of said eccentric ring being journalled for rotation within said first gear, a fixed base member located beneath the turntable, and a fixed second gear ring connected to the base member and located radially outward of said first gear and disposed in mating engagement with said first gear, said second gear being located radially inward of said first gear ring and disposed in mating engagement with said first gear ring, said second gear ring having a greater number of teeth than said first gear and said first gear ring having a greater number of teeth than said second gear, said first gear being moved by rotation of said eccentric ring in the opposite direction at a slower rate of speed than the eccentric ring to provide a speed reduction, and said second gear driving said first gear ring and the turntable in the opposite direction and at a slower rate of speed than said second gear to provide a second speed reduction.

2. The apparatus of claim 1, in which the drive means comprises a plurality of hydraulic motors.

3. The apparatus of claim 1, in which the drive means comprises a plurality of drive members mounted on the turntable, a drive shaft connected to each drive member and extending through the turntable, a pinion carried by each shaft, and a gear member connected to the eccentric ring and disposed in mating engagement with said pinions, rotation of said pinions serving to drive the gear member and rotate the eccentric ring.

4. The apparatus of claim 1, in which the floating gear unit has a generally U-shaped cross section and said floating gear unit includes a web portion which connects said first large gear and said second small gear.

5. The apparatus of claim 1, in which the teeth on the first gear, the second gear, the first gear ring and the second gear ring have the same size and shape.

6. The apparatus of claim 1, in which the second gear is spaced radially inward of the first gear and the eccentric ring is located in the space between said first and second gears.

7. The apparatus of claim 1, in which the turntable is provided with a downwardly extending peripheral flange, and said flange is journalled for rotation on said fixed base member.

8. The apparatus of claim 1, in which said floating gear unit has a generally U-shaped cross section and said second gear is spaced radially inward of said first gear, said eccentric ring and said first gear ring being located in the space between said first and second gears.

9. The apparatus of claim 1, in which the turntable is spaced above the base member to provide a chamber therebetween and said eccentric ring and said first gear unit and said floating ring are located within said chamber.

10. The apparatus of claim 9, in which the chamber contains a lubricating medium and said first gearring and said first gear are provided with a series of openings communicating with the respective surfaces of said eccentric ring.

11. The apparatus of claim 1, and including first bearing means for journalling the inner surface of said eccentric ring about the outer surface of the first gear ring, and second sleeve bearing means for journalling the outer eccentric surface of said eccentric ring within said first gear.

12. In an apparatus having a rotatable working member, a turntable to support the working member and disposed to rotate about a generally vertical axis, an eccentric ring disposed beneath the turntable and having an outer eccentric surface, a plurality of drive members mounted on the upper surface of the turntable and drivingly connected to the eccentric ring for rotating said eccentric ring, a first gear ring connected to the turntable and extending downwardly from said turntable and located radially inward of said eccentric ring, the inner surface of said eccentric ring being concentric with the axis of the rotation of said turntable and journalled for rotation about the outer surface of said first gear ring, a floating annular member including a large first gear and a second small gear, said first gear being located radially outward of said eccentric ring and the outer eccentric surface of said eccentric ring being journalled for rotation within said first gear, a fixed base member located beneath said turntable, and a fixed second gear ring connected to the base member and located radially outward of said first gear and disposed in mating engagement with said first gear, said second gear ring having a greater number of teeth than said first gear, said second gear disposed radially inward and in mating engagement with said first gear ring and said second gear having a lesser number of teeth than the first gear ring, said first gear being moved by the eccentric in the opposite direction and at a slower rate of speed than the eccentric to provide a first speed reduction, and said second gear driving said first gear ring and the turntable in the opposite direction and at a slower rate of speed than said second gear to provide a second speed reduction.

13. The apparatus of claim 12 in which the turntable is provided with a downwardly extending peripheral flange, and means for journalling said peripheral flange around the outer surface of said second gear ring.

References Cited

UNITED STATES PATENTS

| | | | |
|---|---|---|---|
| 1,903,218 | 3/1933 | Knight | 74—805 X |
| 2,049,696 | 8/1936 | Fliesberg | 74—805 |
| 2,079,663 | 5/1937 | Rasmussen | 308—230 X |
| 3,029,955 | 4/1962 | Perkins | 212—69 |

ARTHUR T. McKEON, *Primary Examiner.*

U.S. Cl. X.R.

74—805

UNITED STATES PATENT OFFICE
CERTIFICATE OF CORRECTION

Patent No. 3,424,318                                                   January 28, 1969

Ervin H. Lorence

It is certified that error appears in the above identified patent and that said Letters Patent are hereby corrected as shown below:

Column 6, line 55, cancel "unit" and insert -- ring --; same line 55, cancel "ring" and insert -- gear unit --.

Signed and sealed this 14th day of April 1970.

(SEAL)
Attest:

Edward M. Fletcher, Jr.                             WILLIAM E. SCHUYLER, JR.
Attesting Officer                                              Commissioner of Patents